Aug. 6, 1963  A. B. SEGUR  3,099,858
POULTRY BREAK-APART METHOD
Filed May 5, 1960  2 Sheets-Sheet 1

INVENTOR:
Asa B. Segur,
BY Dawson, Tilton, Fallon + Lungmus,
ATTORNEYS.

Aug. 6, 1963  A. B. SEGUR  3,099,858
POULTRY BREAK-APART METHOD
Filed May 5, 1960  2 Sheets-Sheet 2
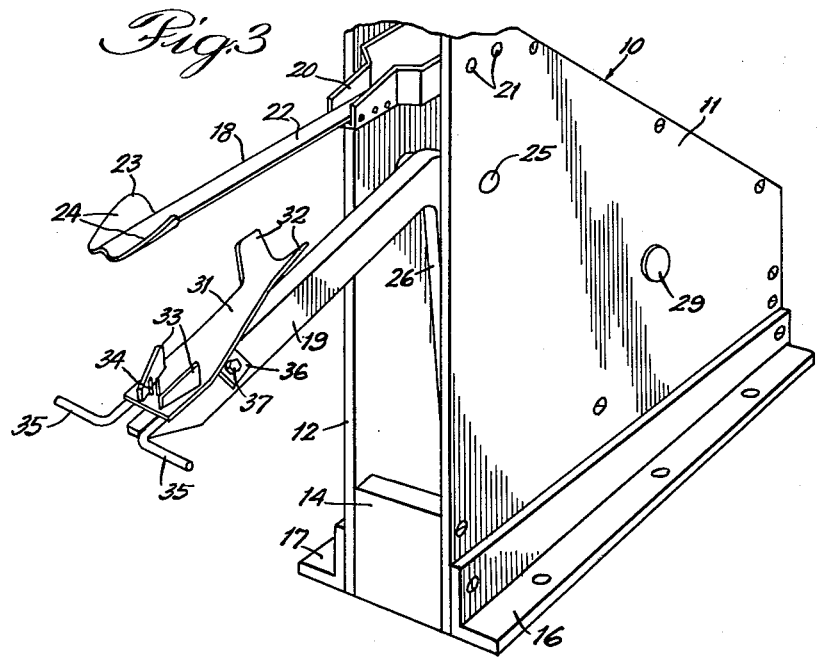
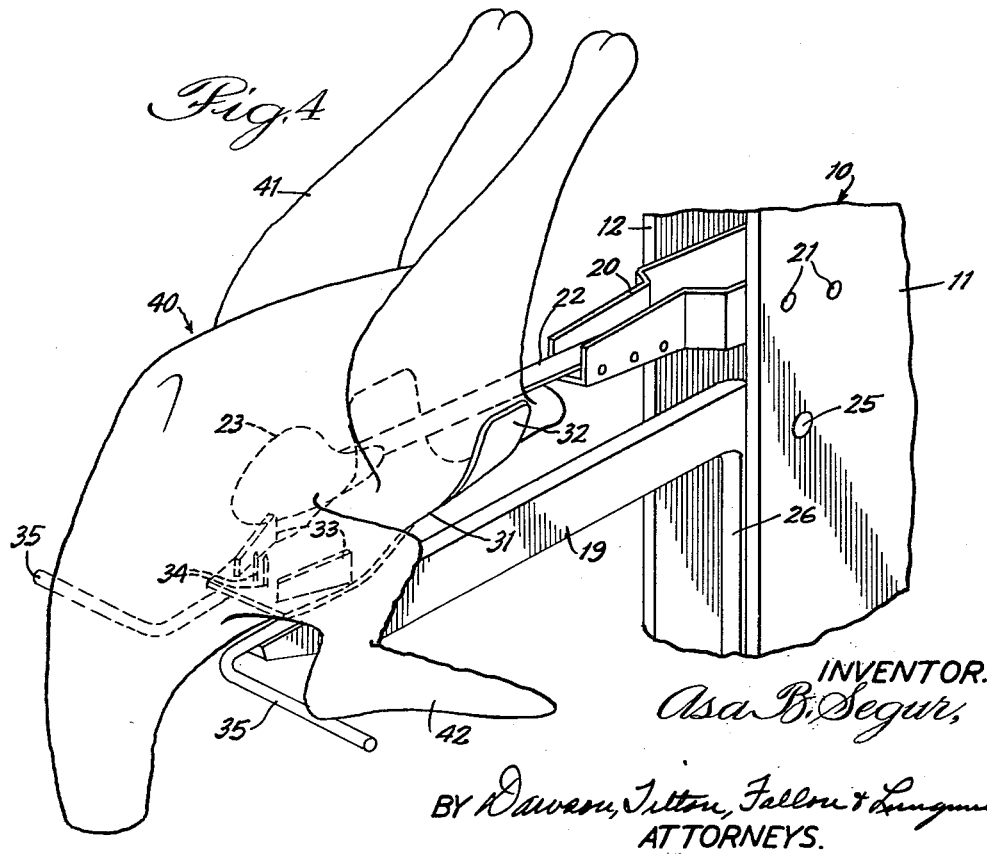
INVENTOR:
Asa B. Segur,
BY Dawson, Tilton, Fallon & Lungmus,
ATTORNEYS.

United States Patent Office 3,099,858
Patented Aug. 6, 1963

3,099,858
POULTRY BREAK-APART METHOD
Asa B. Segur, 1185 S. Ridgeland Ave., Oak Park, Ill.
Filed May 5, 1960, Ser. No. 27,093
7 Claims. (Cl. 17—45)

This invention relates to an improved method and apparatus for separating or breaking apart poultry carcasses as a preliminary step in a poultry meat removal operation.

In commercial poultry processing plants where meat is to be removed from poultry (usually cooked or partially cooked) for use in soups, pies and the like, it is customary to provide a poultry dismembering station. There, an operator removes the wings and legs from the carcasses and places the various components into separate pans for subsequent meat removal. Specifically, an operator grips a carcass in one hand and pulls off the legs and wings with the other hand.

For efficiency of operation, it is important that the carcasses be dismembered uniformly and that each component remains intact until it reaches its particular meat removal station. Thus, at the dismembering station, the legs should each be broken cleanly away at the hip socket (acetabulum); if on occasion the back of the fowl should also come apart in the relatively weak region between the synsacrum and the thoracic vertebrae, then standardized procedures at the subsequent meat removal stations can no longer be followed and inefficiency results.

In any commercial operation where meat is removed from poultry by conventional methods, there is the danger that small bones may be removed along with the meat and may ultimately reach the consumer in the package food product. The problem arises principally at that station where meat is removed from the body of the fowl, the appendages having been previously removed therefrom. Ordinarily, when an operator separates the back and breast portions of the body, some of the vertebral ribs may remain with the back portion while other of the small vertebral ribs may tend to remain with the breast section. Since at least some of these ribs might be connected to either section, an operator at the meat removal station might easily make the wrong assumption and, in attempting to remove quickly the meat from the side portions of these sections, might accidentally and unknowingly remove tiny rib bones and bone fragments along with the meat. The danger of this occurring is increased where, as in most commercial meat removal operations, knives are used for cutting meat away from the bones.

Accordingly, it is an object of the present invention to provide a poultry break-apart apparatus and method which greatly reduce the likelihood of bone contamination in the final meat product. Another object is to provide means for supporting a fowl so that the back and breast sections may be readily separated in such a way that the vertebral ribs will remain connected to the back section and will separate cleanly from the sternal ribs of the breast section. Another object is to provide supporting means for supporting a poultry carcass so that the legs may be easily detached from the hip sockets without danger that the back or hip bones will break or become fragmented or that pieces of bone from the back section will be removed along with the legs. A still further object is to provide a method and an apparatus wherein the so-called tissue meats which extend between the back and breast sections behind the ribs can be removed and salvaged as solid meat instead of being pulled out in the form of widely stretched tissues.

Another object is to provide means for firmly holding a fowl carcass in supine position so as to permit an operator to remove or separate various sections for subsequent treatment at meat removal stations. An additional object is to provide an apparatus equipped with means serving as a fulcrum for the removal of wings from a poultry carcass. Another important object is to provide means for supporting fowl so that an operator may use both hands in separating various sections of the carcass, the support means being constructed to assist the operator in breaking the carcass apart in a predetermined fashion.

Other objects will appear from the specification and drawings in which:

FIGURE 3 is a perspective view of the fixture showing details of the poultry clamping elements;

FIGURE 4 is an enlarged broken perspective view illustrating the fixture with a fowl in clamped position thereon.

Figure 1:
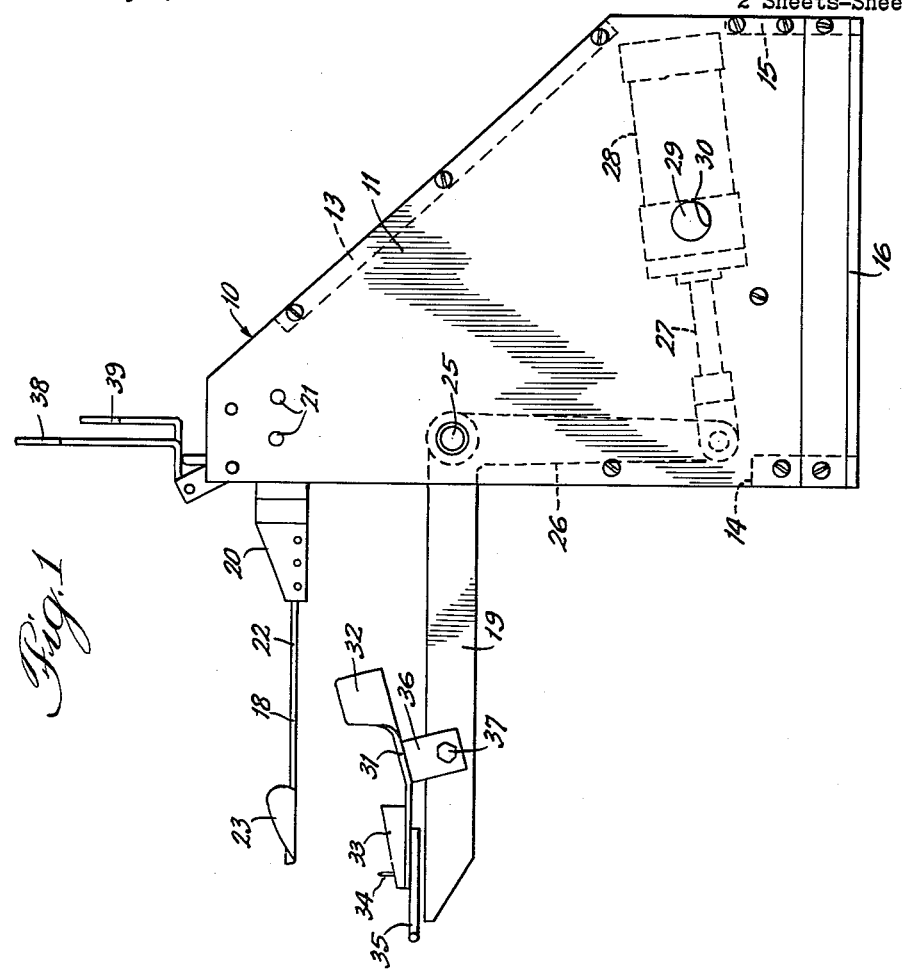
FIGURE 1 is a side elevational view of a poultry break-apart fixture embodying the present invention.

In the embodiment illustrated in the drawings, the numeral 10 generally designates a fixture for supporting a poultry carcass during a break-apart operation. The fixture comprises a pair of parallel and vertical side plates 11 and 12 spaced apart by spacer elements 13, 14 and 15 which are rigidly secured therebetween. Side flanges 16 and 17 are connected to the side walls 11 and 12 and are apertured for attachment of the fixture to a suitable support such as, for example, a table surface. The side plates and their associated elements constitute a frame for supporting poultry clamping arms 18 and 19.

The poultry clamping arms 18 and 19 project forwardly from between the side walls or plates of the fixture. Upper arm or horn 18 includes a mounting bracket 20 affixed to side plates 11 and 12 by rivets 21 or by any other suitable means, an elongated horizontal member 22 affixed to the bracket, and a spade shaped clamping element 23 at the free end of member 22. Preferably, the elongated member 22 of the upper arm or horn 18 is channel shaped, having an inverted U-shaped cross section. The clamping element 23 may be formed integrally with inverted channel member 22 and provides a pair of laterally and upwardly curving wings 24. The wings, as well as the concave under surface of member 22, conform closely with the back bone and rib basket contour within the body cavity of the fowl and, during the break-apart operation, the ribs and back are firmly anchored against movement by the horn, as will be brought out more clearly hereinafter.

Figure 2:
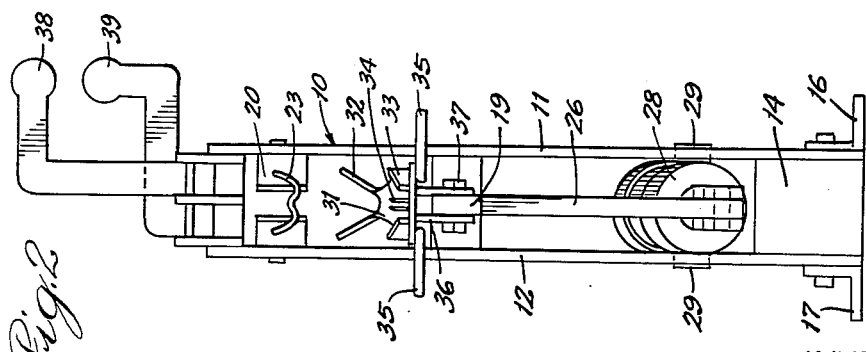
FIGURE 2 is a front elevational view of the fixture.

The lower arm 19 is pivotally mounted by pin 25 to side plates 11 and 12 and, at its rear end beneath the transverse pin, is provided with a depending lever extension 26. The lower end of the lever is connected to plunger 27 of an air cylinder 28. The cylinder is pivotally supported between the side plates by lateral projections 29 rotatably received within openings 30. When the air cylinder is actuated to extend plunger 27, the free forward end of arm 19 moves upwardly towards the stationary upper arm 18 and when the air cylinder is actuated to retract plunger 27 arm 19 swings downwardly into the lowered position illustrated in FIGURES 1–3.

Near its free forward end, lower arm 19 is provided with a saddle 31 of developed shape which conforms closely with the outer back contour of a fowl. As shown most clearly in FIGURES 1 and 3, saddle 31 comprises a longitudinally elongated plate having upwardly curved side flanges or wings 32 at its rear end. Adjacent the saddle's forward end are a pair of spaced and forwardly tapering upstanding members 33 and, between the spaced forward ends of these members, are a pair of laterally spaced nails or pins 34. A pair of L-shaped wing-removal bars 35 are welded or otherwise secured to the under surface of the saddle and project forwardly and then laterally from the front end of that saddle. The saddle may be secured to the front end of arm 19 by any suitable means. In the illustration given, the saddle is equipped with depending connecting plates 36 which are bolted to the arm. In operation, the saddle is rigidly secured to the arm; however, the bolt 37 may be loosened to permit adjustment of the saddle when such adjustment is required. Also, bolt 37 permits replacement of saddle 31 with a larger or different sized saddle, as where a saddle for supporting turkeys is to be substituted for a smaller chicken-supporting saddle.

Suitable control means, in the form of levers 38 and 39, are provided for actuating the air cylinder to lower and raise arm 19 and the saddle carried thereby. When lever 38 is urged rearwardly, air flows into the front end of the valve-controlled cylinder 28 to urge plunger 27 rearwardly and lower arm 19. Similarly, when lever 39 is urged forwardly, air flows into the cylinder to extend plunger 27 and raise the free end of the lower arm. Since the construction and operation of the air cylinder and its actuating means are entirely conventional, further description is believed unnecessary for the purpose of disclosing the present invention.

In the preferred operation of the apparatus, the poultry upon arrival at the break-apart station are viscerated and cleaned with their heads, feet and feathers all removed. Ordinarily, but not necessarily, the poultry will be cooked or partially cooked. The operator, using one hand, takes a whole fowl 40 from a suitable receptacle and inserts it upon the upper arm 18 so that its legs 41 face upwardly and the spade-like element 23 passes forwardly into the body cavity through the rear opening thereof. With a forward movement of his hand, the operator touches control lever 39 which closes the arms. With the pivotally mounted lower arm 19 fully raised, the fowl 40 is firmly clamped in position upon saddle 31, as illustrated in FIGURE 4.

As arm 19 moves upwardly into its raised position, nails 34 penetrate the back of the fowl on each side of the vertebral column to prevent any lateral movement of the carcass during the subsequent break-apart operation. Upstanding elements 33 bear firmly against the back between the vertebral column and the scapula bones so that later, during separation of the breast and back sections, the scapula bones will be removed with the breast section rather than remain with the back. Elements 33 also contribute to preventing lateral movement of the fowl when it is in clamped position upon the saddle and assist in promoting a clean separation of the wings 42 from the wing sockets of the pectoral girdle, as will now be described.

After the fowl has been clamped upon the saddle 31, the operator, using both hands and with his palms down, grasps each of the wings with his thumbs at the points of wing attachment to the coracoid bones and his fingers wrapped around the upper sides of the wings. Each wing is then rotated rearwardly about its point of attachment to the body so that the palms of the worker's hands are turned upwardly. This twisting action breaks loose most of the ligaments at the main wing joints. Thereafter, the operator grips the wings and bends them downwardly in front of lateral bars 35. The bars serve as fulcrums and, as the wings are twisted downwardly in front of the bars and then upwardly behind the bars, they are pulled cleanly from their sockets.

After placing the detached wings 42 in appropriate pans, the operator, again using both hands, grips the legs 41 of the clamped fowl and, with his thumbs disposed between the legs and the body adjacent the sockets, pries and pulls the legs downwardly and outwardly. The legs are thereby detached from the body of the fowl, the upstanding wings 32 of the cradle promoting a clean break at the hip socket and preventing the removal of meat from the rear back portion of the fowl about the pelvic girdle.

As previously mentioned, the elongated member 22 of upper arm or horn 18 conforms to the spinal contour within the carcass and, in combination with the saddle 31 and the wings 32 thereof, holds the synsacrum and innominate bones of the pelvic girdle stationary as the legs 41 are being detached from the carcass. Therefore, the clamping elements of the upper and lower arms eliminate or greatly reduce the possibilities that the pelvic girdle will be broken away from the vertebral column or will become chipped or broken in any other manner during the leg removal step.

The two legs are placed in separate pans. Since the operator uses both hands in removing the paired appendages, the removal of the wings and legs is performed quickly in two simple steps. Furthermore, by performing the same operation with both hands at the same time, the operator is able to perform substantially identical movements in removing the appendages on opposite sides of the fowl, thereby insuring substantially uniform or symmetrical dismembering of the carcass during the break-apart operation.

After the appendages have been removed, the operator hooks the first finger of each hand about the last rib on each side of the fowl and draws his thumbs along the sides of the fowl from the wing sockets to the rear end of the sternum. This action tends to unlace or weaken the connections between the vertebral ribs and the relatively heavy and secure sternal ribs, and also scores the meat between the back and breast sections. Then, with one hand, the operator grips the breast at the rear end of the sternum and pulls it upwardly and forwardly, pivoting the breast about the front end of the pectoral girdle. After pivoting the breast to an angle of approximately 30 degrees, it is pulled forwardly and downwardly to release and withdraw the scapulae which extend along the front portion of the back on opposite sides of nails 34. The breast is then drawn cleanly away from the back section with the vertebral ribs remaining attached to the back section and the scapulae connected to the breast. As the breast section is being carried to a suitable plan, the operator, with the same hand, strikes lever 38 to release the clamp. With return movement of the same hand, the operator removes the back section from the lowered saddle and, with his other hand, places a fresh carcass in supine position upon upper arm 18. The foregoing procedure is then repeated.

It is to be noted that during the break-apart operation the carcass of the fowl is clamped firmly in a stationary supine position and that there is no prolonged contact between that fowl and a worker's hands. The appendage removing steps are performed swiftly and the appendages are released by the operator as soon as they have been removed from the body. Similarly, the contact between the carcass and the operator's hands during the back and breast separation step is only of very limited duration. This is important because the apparatus and method of the invention permit the dismembering and breaking apart of poultry carcasses immediately after a cooking operation and while they are still hot. Ordinarily, in a conventional poultry processing operation where meat is to be removed therefrom, it is necessary to allow the poultry to cool since the usual dismembering operation requires an operator to hold the fowl in one hand while the appendages are removed with the other. Here, the operator has both hands free for dismembering and breaking apart the carcass and, in addition, such an operation may be performed immediately after the poultry has been removed from the cooking kettle. The result is a fast and highly effective method for separating poultry carcasses into sections and for reducing the period of meat exposure to flavor loss and possible bacteria formation between the cooking of the poultry and the freezing of further processing of the removed meat.

As brought out above, the ribs of the carcass remain with the back section as the breast section of the fowl is pulled away. Since all fowl passing through the break-apart station are dismembered and broken apart in a substantially identical manner, operators at subsequent meat-removal stations receive carcass sections having substantially uniform meat and bone arrangements. As a result, there is little or no chance that bones or bone fragments will become accidentally removed with the meat and will ultimately reach the consumer. The operator at the station for removal of meat from poultry breasts may remove the meat without concern for loosely connected vertebral ribs (since such bones remain with the back sections) and the operators at the stations for removal of meat from the back sections may adopt a standardized procedure for removing meat from the vertebral rib baskets without detaching those ribs from the vertebral columns. Thus, the apparatus and method of the present invention eliminates or greatly reduces the possibilities of bone contamination in the final meat product.

While in the foregoing I have disclosed an embodiment of the invention in considerable detail for purposes of illustration, it will be understood by those skilled in the art that many of these details may be varied without departing from the spirit and scope of the invention.

I claim:

1. In a poultry break-apart method, the steps comprising clamping the backbone and vertebral ribs of a poultry carcass in supine position, removing the appendages from the clamped carcass, and thereafter pulling the breast section of the carcass upwardly away from the clamping back section, the appendage removing step including twisting the wings in their sockets and simultaneously rotating the same forwardly and downwardly about rigid lateral fulcrum elements to pull both of said wings cleanly from their body sockets at the same time.

2. In a poultry sectioning method, the steps of clamping the backbone and vertebral ribs of a poultry carcass between a pair of vertically opposing internal and external clamping elements to support said carcass in fixed supine position, removing corresponding appendages from opposite sides of said carcass at the same time, scoring the meat on each side of the clamped carcass along the connections between the sternal and vertebral ribs thereof, and thereafter pulling the breast section upwardly and forwardly to leave the back section of the carcass in clamped position and with the vertebral ribs still connected to the backbone.

3. The method of claim 2 in which the appendage removing step comprises twisting and pulling away corresponding appendages from opposite sides of the clamped carcass at the same time.

4. In a poultry sectioning method, the steps of positioning a poultry carcass in supine position upon a stationary horizontal arm with said arm extending into said carcass through a posterior opening therein, clamping the back portion of said carcass between said arm and a clamping element disposed therebeneath, and thereafter dismembering and breaking apart said carcass while the back portion thereof is clamped in position, said dismembering and breaking apart step including the twisting and pulling of corresponding appendages from opposite sides of the clamped carcass at the same time.

5. A method of dismembering a poultry carcass comprising the steps of supporting said carcass by applying clamping pressure between the interior of said carcass along and to each side of the backbone thereof and the exterior of said carcass along and to each side of said backbone, and then pulling the appendages and breast from the back and vertebral ribs of said carcass.

6. The method of claim 5 in which the second-mentioned step comprises twisting and pulling away corresponding appendages from opposite sides of said carcass at the same time.

7. The method of claim 5 in which said appendages include both the wings and legs of said carcass, said wings being removed from the carcass prior to removal of said legs and breast.

References Cited in the file of this patent

UNITED STATES PATENTS

| | | |
|---|---|---|
| 2,243,951 | Gehlke | June 3, 1941 |
| 2,785,437 | Standley et al. | Mar. 19, 1957 |
| 2,807,046 | Hebenheimer | Sept. 24, 1957 |
| 2,844,844 | Sieczkiewicz | July 29, 1958 |